United States Patent [19]

Lourdeaux

[11] 4,276,905
[45] Jul. 7, 1981

[54] MECHANISM INCLUDING TWO CUT-OFF DEVICES IN SERIES

[75] Inventor: Bernard Lourdeaux, Ismier, France

[73] Assignee: Neyrpic, Grenoble, France

[21] Appl. No.: 128,562

[22] Filed: Mar. 10, 1980

[30] Foreign Application Priority Data

Mar. 13, 1979 [FR] France ................ 79 06321

[51] Int. Cl.³ .................... F16K 5/00; F03B 1/00
[52] U.S. Cl. .................... 137/613; 415/151
[58] Field of Search ............ 137/613, 614, 149.2; 415/151

[56] References Cited

U.S. PATENT DOCUMENTS

| 415,561 | 11/1889 | Ridgway | 415/151 |
|---|---|---|---|
| 990,590 | 4/1911 | Ray | 137/614 |
| 2,512,999 | 6/1950 | Bruning | 137/614.04 |
| 2,919,144 | 12/1959 | Lindenmeyer | 137/614 |
| 3,474,829 | 10/1969 | Scheineman | 251/58 |
| 3,528,447 | 9/1970 | Kolb | 137/614 |
| 3,913,603 | 10/1975 | Torres | 137/68 |
| 4,004,611 | 1/1977 | Friedell | 137/614 |
| 4,056,117 | 11/1977 | Deeks | 137/614.05 |
| 4,090,524 | 5/1978 | Allread et al. | 137/614.02 |

FOREIGN PATENT DOCUMENTS 418707 3/1947 Italy ..................... 137/613

Primary Examiner—Martin P. Schwadron
Assistant Examiner—A. Michael Chambers
Attorney, Agent, or Firm—Haseltine and Lake

[57] ABSTRACT

A mechanism for a hydraulic pipe comprises two rotatable cut-off devices in series arranged inside two half-shells which are arranged symmetrically, relative to a mean transverse plane, and which are connected by being bolted together by their flanges. Each half-shell supports the journals of a cut-off device and an intermediate piece may be provided for supporting center gaskets.

The mechanism is particularly applicable to the protection of turbines in a high-fall hydroelectric installation.

1 Claim, 3 Drawing Figures

MECHANISM INCLUDING TWO CUT-OFF DEVICES IN SERIES

The present invention relates to a mechanism including two cut-off devices in series, particularly but not exclusively for a high-fall hydro-electric installation using turbines.

In installations of this type, including turbines having fixed guide-rings, or turbine pumps, two cut-off valves are arranged in series, as a security measure, in order to protect the hydraulic machinery. The downstream one of the valves ensures the normal opening and closing operations. The upstream one of the valves constitutes a safety device for emergency shut-off if there is an accident involving the downstream valve or the downstream pipe; shut-off in the latter case is referred to as "open sluice" shut-off.

Figure 1:
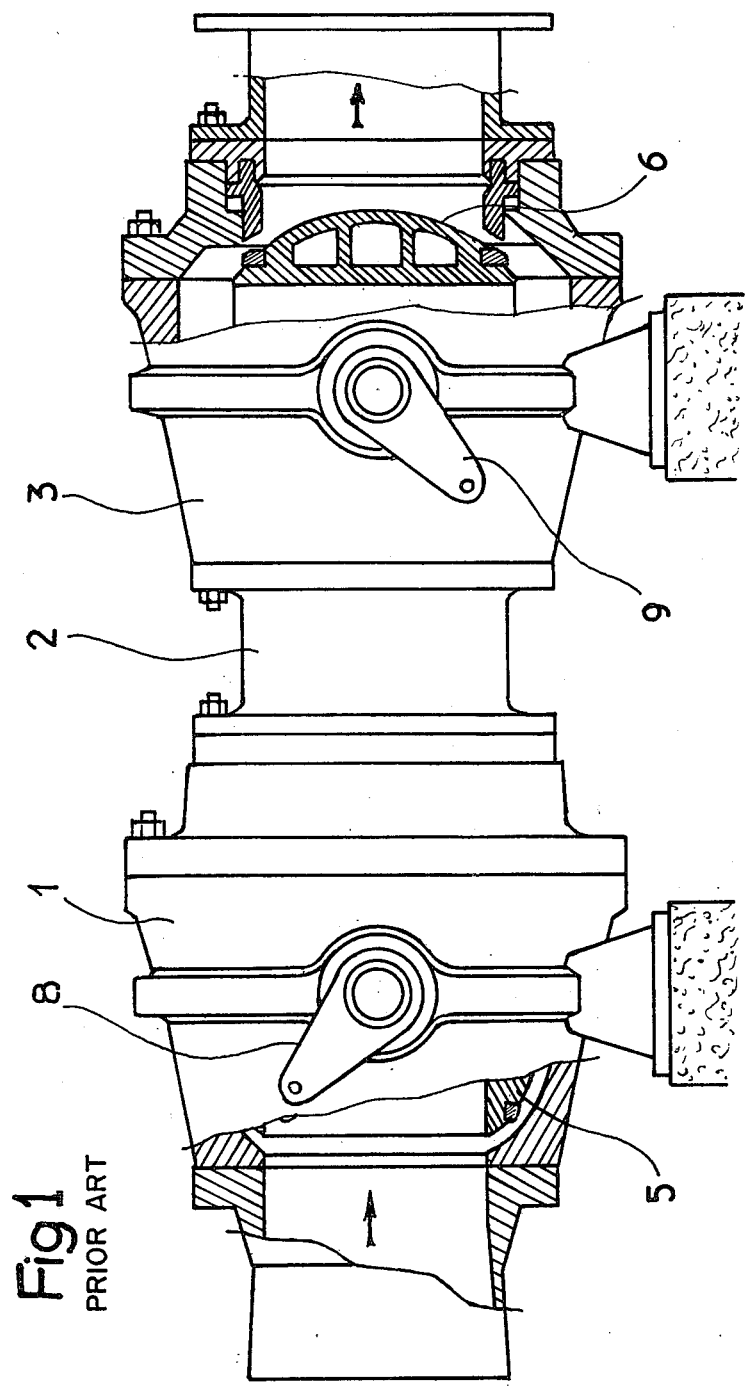

Hitherto, this has been achieved using two valves mounted in series on the same pipe, each valve of course being equipped with hydraulic control jacks. FIG. 1 of the drawings is a simplified representation of the valves of an installation of this type, which successively comprise an upstream valve 1 having a cut-off device 5, an intermediate disconnecting sleeve 2 and a downstream valve 3 having a cut-off device 6. The control mechanisms of the two cut-off devices 5 and 6, which could be jacks anchored in the concrete of the passageway and having rods which are articulated at the end of control levers 8 and 9 respectively of the devices 5, 6 have not been shown in the Figure in order to simplify the drawing. The control mechanisms could alternatively comprise jacks which are each fixed directly to the shell of the valve in question, as described, for example, in French Pat. No. 1,363,146.

This arrangement has the disadvantage of constituting a longer piece of equipment of virtually twice the bulk of a single valve. It therefore represents a heavy and expensive installation which also requires a passageway of greater dimensions for the purpose of inspections and maintenance.

It is an object of the invention to reduce the bulk and weight of such equipment and applies to a mechanism, with two cut-off devices in series, for a high-fall hydraulic pipe, which mechanism comprises an upstream cut-off device and a downstream cut-off device, both of which can rotate on journals.

According to the invention, there is provided a mechanism for a hydraulic pipe comprising:
an upstream cut-off device;
a downstream cut-off device;
journals for supporting said cut-off devices in rotation; and
a shell adapted for connection to the hydraulic pipe upstream and downstream thereof and comprising an upstream half-shell and a downstream half-shell, said shells being arranged symmetrically, relative to a mean transverse plane, and connected to one another by being bolted onto flanges thereof;
said cut-off devices being arranged in series in said shell with the respective journals thereof supported by said respective half-shells thereof.

According to a preferred embodiment of the invention, the mechanism comprises a generally planar intermediate piece arranged between said two cut-off devices, and which extends between said flanges for joining said upstream half-shell and said downstream half-shell, and at least one gasket for at least one of said cut-off devices provided on said intermediate piece.

An embodiment according to the invention will now be described by way of example only, with reference to FIGS. 2 and 3 of the drawings.

In the drawings:
FIG. 2 is an axial section through an embodiment of mechanism according to the invention, perpendicular to the axes of rotation of the cut-off devices; and
FIG. 3 is a side view of the mechanism of FIG. 2.

Figure 2:
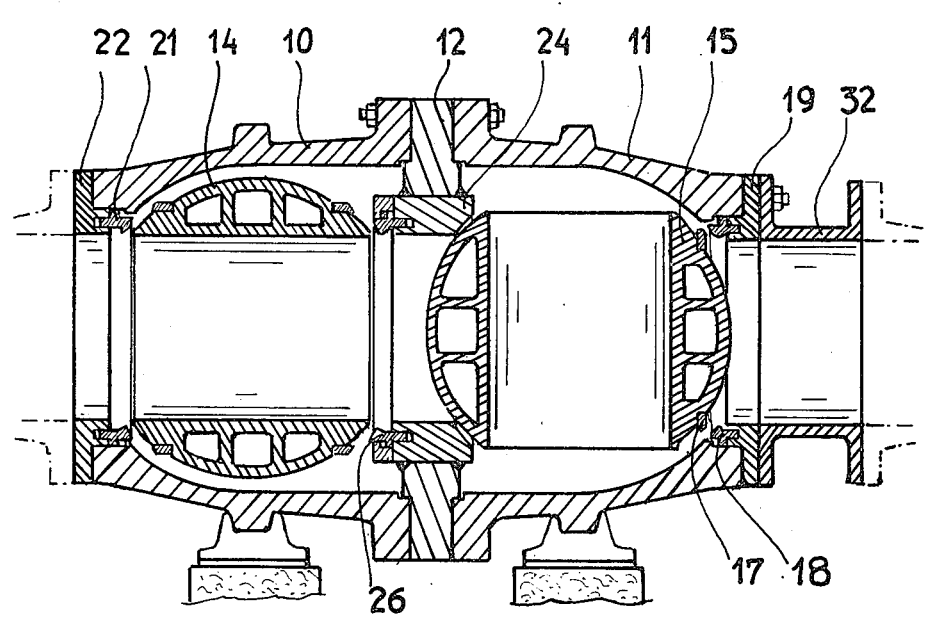
Figure 3:
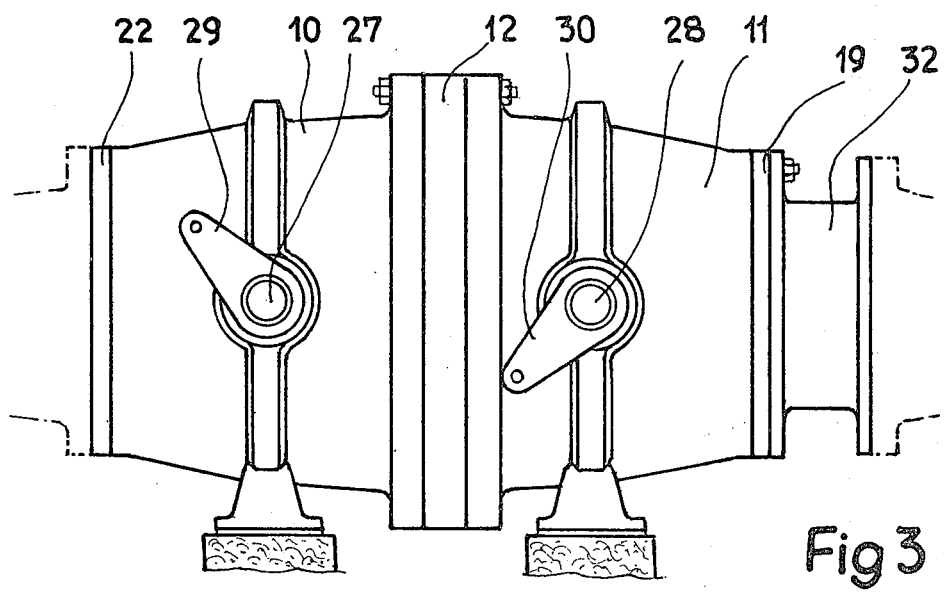

Referring to FIGS. 2 and 3, the double valve mechanism comprises two cut-off devices 14, 15 housed within a shell which mainly comprises two symmetrical half-shells 10 and 11, which are joined by being bolted together by their flanges, a generally planar intermediate piece 12 extending between the flanges of the half-shells. Advantageously, the upstream and downstream half-shells 10 and 11 each consist of the upstream element of the shell of a single valve as shown in FIG. 1.

In the embodiment of FIGS. 2 and 3, the double valve comprises two seals for the upstream spherical cut-off device 14, which is shown in the open position, and a single seal for the downstream spherical cut-off device 15, which is shown in the closed position but without application of the gaskets. In known manner, for the downstream seal of the downstream cut-off device 15, a fixed seat or gasket 17 carried by the downstream cut-off device 15 is conjugated, in the closed position of the cut-off device 15, with a movable gasket 18, mounted in a gasket-carrying ring 19. The hydraulic system for causing the movable gasket 18 to bear on the fixed seat or gasket 17 is not shown because it is well known in this type of valve. A completely analogous mechanism is used for the upstream seat or gasket of the upstream cut-off device 14, a movable gasket 21 being mounted in a gasket-carrying ring 22 for bearing against the seat or gasket of the cut-off device 14 in its closed position.

A movable downstream gasket 26 for bearing against a seat or gasket of the upstream cut-off device 14 is mounted in a ring 24 welded to and forming part of the intermediate piece 12, and in this case again, the hydraulic system for displacing the movable gasket 26 has not been shown.

The cut-off devices 14 and 15 are each provided with journals 27 and 28, and operating levers 29 and 30, for coupling to a known control jack, are provided on the outside of the shell.

It is seen that, compared with the known arrangement shown in FIG. 1, the bulk of an intermediate sleeve and of a downstream shell has been eliminated, this corresponding to a total reduction in bulk of about one pipe diameter. A reduction in weight, which can reach 20%, can thus be achieved, whilst at the same time retaining the same degree of safety and even improving it to a certain extent by virtue of the greater rigidity of the gasket-carrying intermediate piece, which reduces the risks of deformation of the gasket bearings.

Of course, the invention is not intended to be strictly limited to the embodiment which has been described by way of example only. On the contrary, it also includes embodiments which only differ therefrom in details, in different methods of operation of in the use of equivalent means. Thus, an upstream gasket for the downstream cut-off device 15 could also be mounted on the ring 24. Conversely, if the particular conditions allowed, it would also be possible to envisage retaining only the end gaskets, and to simplify, or even dispense with, the intermediate piece between the two shells 10 and 11.

What is claimed is:

1. A tandem hydraulic valve assembly for use in high pressure and high flow environments such as a high-fall hydroelectric installation, the valve comprising:

a main valve shell, including an upstream shell half and a downstream shell half symmetrically disposed on opposite sides of a transverse medial plane, the respective shell halves having radial flanges at the mutually presented juxtaposed ends thereof;

bolts extending through said flanges and immovably securing the respective shell halves to each other;

a rotatable valve member and an adjacent cooperating valve seat therefor positioned within said upstream shell half;

a rotatable valve member and an adjacent cooperating valve seat therefor positioned within said downstream shell half; and a journal for each rotatable valve member, the respective journals being supported in their associated shell half for independent rotary movement, and a generally planar plate interposed between said mutually presented juxtaposed ends of the respective shell members and their associated flanges, said bolts extending through said plate and said flanges and immovably securing said plate and said shell halves to each other, and at least one of said adjacent valve seats carried by said plate and cooperating with an adjacent one of said valve members.

* * * * *